PULSE DISTRIBUTOR FOR TIME-SHARING SYSTEMS

Filed Dec. 7, 1967 6 Sheets-Sheet 1

Fabio Balugani
Franco Mammucari
INVENTORS.

BY Karl F. Ross
ATTORNEY

Fabio Balugani
Franco Mammucari
INVENTORS.

BY Karl F. Ross
ATTORNEY

Fabio Balugani
Franco Mammucari
INVENTORS.

BY Karl G. Ross
ATTORNEY

Dec. 29, 1970 F. BALUGANI ET AL 3,551,888

PULSE DISTRIBUTOR FOR TIME-SHARING SYSTEMS

Filed Dec. 7, 1967 6 Sheets-Sheet 4

Fabio Balugani
Franco Mammucari
INVENTORS.

BY Karl F. Ross
ATTORNEY

Fabio Balugani
Franco Mammucari
INVENTORS.

BY Karl F. Ross
ATTORNEY

PULSE DISTRIBUTOR FOR TIME-SHARING SYSTEMS

Filed Dec. 7, 1967 6 Sheets-Sheet 6

Fabio Balugani
Franco Mammucari
INVENTORS.

BY Karl F. Ross
ATTORNEY

United States Patent Office 3,551,888

Patented Dec. 29, 1970

3,551,888
PULSE DISTRIBUTOR FOR TIME-SHARING SYSTEMS

Fabio Balugani and Franco Mammucari, Milan, Italy, assignors to Societa Italiana Telecomunicazioni Siemens S.p.A., Milan, Italy, a corporation of Italy

Filed Dec. 7, 1967, Ser. No. 707,341
Claims priority, application Italy, Dec. 9, 1966, 30,876/66
(Filed under Rule 47(a) and 35 U.S.C. 116)
Int. Cl. H04q *9/00*
U.S. Cl. 340—166 17 Claims

ABSTRACT OF THE DISCLOSURE

A set of coincidence gates $A_{11}$, $A_{12}$ . . . $A_{68}$ are disposed in an orthogonal matrix, akin to a cross-bar switch, so as to form *n* rows and *m* columns under the control of respective row switches $E_{11}$, $E_{12}$ . . . $E_{16}$ and column switches $E_{21}$, $E_{22}$ . . . $E_{28}$ which respond in turn to row-identification and column-identification signals originating from a selector B with *mn* individually actuatable units $B_{11}$, $B_{12}$ . . . $B_{68}$. At the beginning of a distribution cycle, the row switches assigned to all actuated selector units are enabled by a start signal A*vv* whereas the assigned column switches are merely conditioned for subsequent enablement upon activation of the corresponding row switches. The first enabled row switch is also activated by the start signal A*vv* and conditions every column switch assigned to a common selector unit for enablement by a periodically recurring sampling pulse S*c* which also activates the first column switch so enabled. A periodically recurring input signal C then passes the coincidence gate (e.g. $A_{11}$) controlled by the activated row and column switches (e.g. $E_{11}$, $E_{21}$) to produce a pulse on the corresponding output line (e.g. $U_{11}$) whereupon the activated column switch responds to a column-reset pulse R*c* and immediately activates the next enabled column switch. After all the enabled column switches have been reset, a row-reset pulse R*r* disables the previously activated row switch with resulting activation of the next enabled row switch, the latter in turn enabling the first conditioned column switch assigned to a common selector unit for activation or reactivation by the next sampling pulse S*c*. A presetting pulse P*s* at the end of a cycle restores any remaining off-normal row and column switches to normal preparatorily to the arrival of the next starting pulse A*vv*.

Our present invention relates to a pulse distributor for time-sharing systems wherein a given number of communication channels are utilized for the selective transmission of a like or smaller number of signals originating from a multiplicity of sources whose total number may exceed the number of available channels and which are periodically sampled during successive distribution cycles. Such systems are used in telecommunication, remote measuring or control, switching arrangements and the like. A typical installation of this description, forming part of a telephone communication system, has been disclosed in commonly owned application Ser. No. 637,164 filed by us, jointly with Isidoro Poretti, on May 4, 1967, now Pat. No. 3,410,-036.

In previous distribution systems of this type it has been necessary to sample, during each cycle, both the active and the inactive signal sources and to provide means for skipping inactive sources so that only the active ones were sequentially connected to respective output lines. The skipping of inactive signal generators, even when carried out at high speed, requires a finite length of time so as to delay the allocation of the available channels.

It is, therefore, the general object of our present invention to provide means in such time-sharing system for accelerating the distribution of signal pulses to the available output lines by virtually eliminating the time heretofore required for ascertaining the active or idle state of a pulse generator. This object is realized, pursuant to our present invention, by the provision of a matrix of circuit elements, such as coincidence gates, arrayed in *n* rows and *m* columns, the number *nm* of such elements corresponding to the number of output lines; a like number of selector units, individually actuatable and respectively associated with the several coincidence gates, are subdivided into *n* groups of *m* units, each group being assigned to a respective row switch while corresponding units in each group are assigned to a respective column switch. Each row switch has an input connected to all the units of its assigned group whereas each column switch has an input connected to one assigned unit in each group. The input connections of the row switches form part of a first circuit arrangement which may include a source of starting pulses, operative at the beginning of each distribution cycle, for enabling all the row switches assigned to groups with seized or actuated units, the switches so enabled being sequentially activatable; the input connections of the column switches form part of a second circuit arrangement which includes a logic network, generally a set of AND gates, serving to permit enablement of only those column switches whose assigned selector units lie in a group assigned to a concurrently activated row switch. At the beginning of a distribution cycle, e.g. in response to the starting pulse, the first row switch to be enabled is also activated; the subsequent arrival of a sampling pulse, applied to all the column switches in the deactivated condition of the entire set, results in the enablement of all the column switches conditioned for such enablement by the seizure of their assigned selector units within the group controlling the activated row switch. The first enabled column switch is immediately acticated and emits an activation signal which, together with a similar signal from the activated row switch, triggers (e.g. unblocks) the circuit element positioned at the intersection of the corresponding row and column. The activated column switch is then deactivated by a column-resetting signal whereupon the next enabled column switch is activated in the aforedescribed manner. After all the previously enabled column switches have been thus activated and disabled, a row-resetting pulse disables the heretofore activated row switch and causes activation of the next enabled row switch, with consequent activation or reactivation of any column switch having input connections to a unit of the selector group controlling the newly activated row switch. In this manner, all the enabled row and column switches are sequentially activated to generate distribution pulses on the output lines of the associated coincidence gates or equivalent circuit elements. The output pulses thus generated may be used, for example, to initiate transmission of massage samples (e.g. in the form of digital code pulses) between a trunk channel and a local subscriber line, e.g. as more fully described in the aforementioned commonly owned application; this transmission may occur simultaneously, after temporary storage of the message samples over part of a distribution cycle.

If the number of actuated selector units exceeds the number of sampling intervals within a distribution cycle (the latter number corresponding to the number of available transmission channels), one or more row and column swtiches may remain enabled at the end of a cycle. In order to restore the system to normal under such circumstances, we prefer to provide a source of presetting pulses which clear the matrix by restoring, just before the occurrence of the next starting pulse, any switch that may have remained off-normal.

The terms "row" and "column" are used herein in an electrical sense only and do not necessarily designate a corresponding geometrical arrangement, even though a physical array of orthogonal rows and columns—as in a conventional cross-bar switch—may be conveniently employed.

The invention will be described in greater detail with reference to the accompanying drawing in which.

Figure 1:
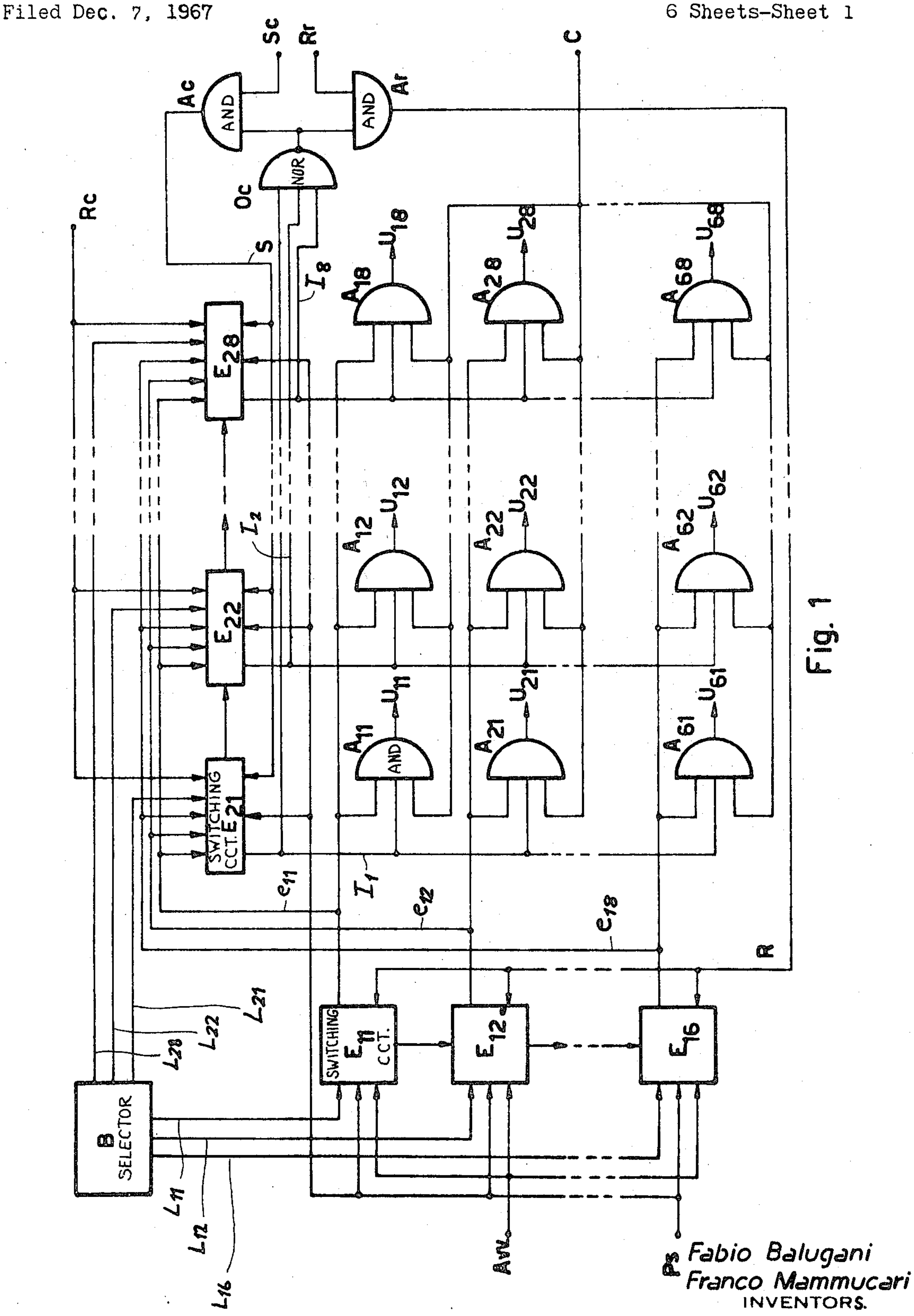
FIG. 1 is an overall circuit diagram of a pulse distributor according to this invention.
Figure 7:
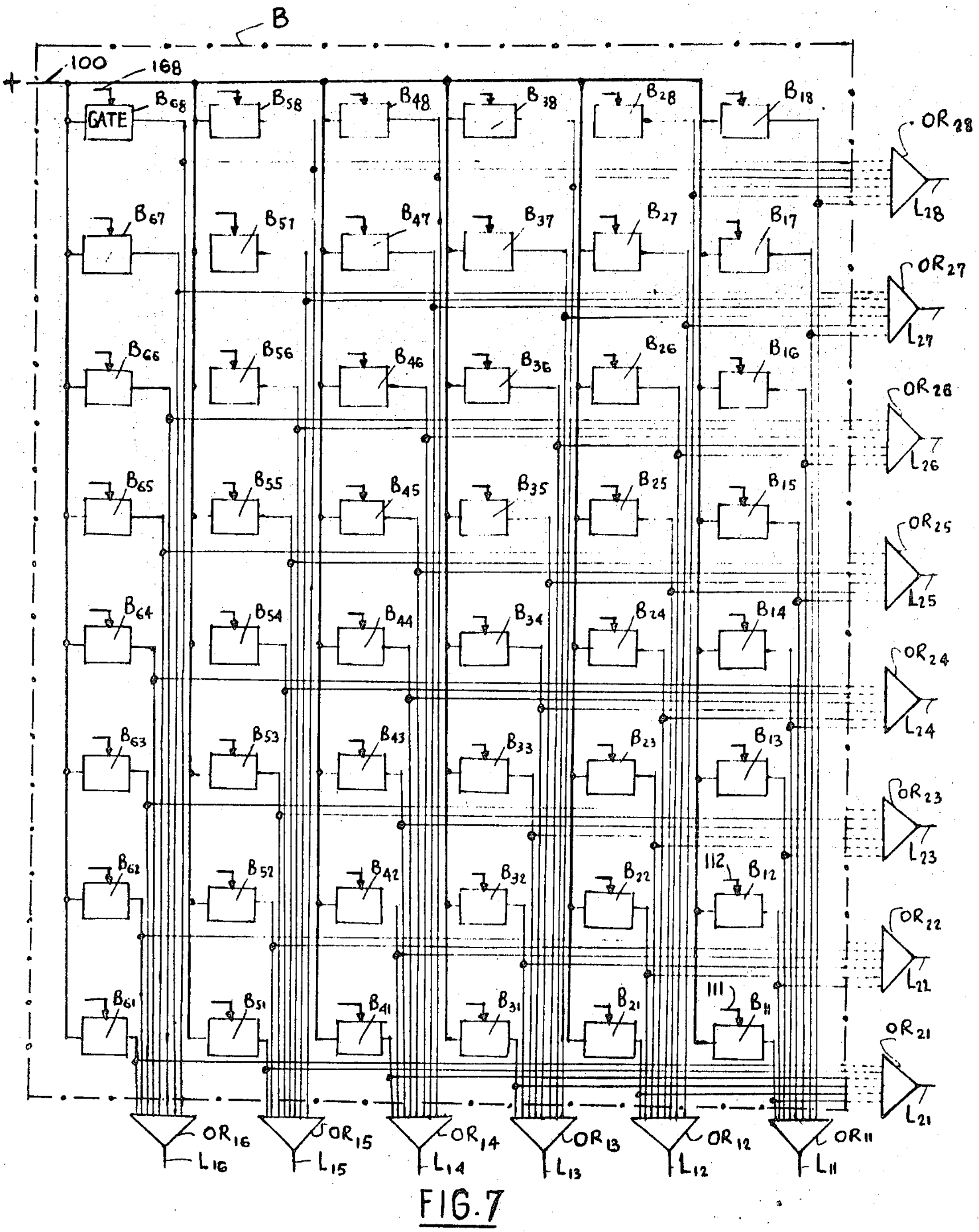
FIG. 7 is a block diagram of a selector included in the system of FIG. 1.

The pulse distributor illustrated in FIG. 1 comprises a selector B which, as shown in detail in FIG. 7, consists of 48 units divided into six groups of eight units each, the units being designated $B_{11}$ . . . $B_{18}$ in the first group, $B_{21}$ . . . $B_{28}$ in the second group, and so forth. Each unit is shown as a simple gate adapted to pass a voltage (here positive) from a bus bar 100 upon being unblocked by way of an individual lead 111, 112 . . . 168 whose energization seizes the unit for one or more distribution cycles. Such seizures may occur, again as described in the copending application referred to above, in response to communication signals above a predetermined threshold level present on a respective subscriber line. More generally, however, the gates $B_{11}$–$B_{68}$ may respond to any desired external criteria.

The outputs of the eight selector gates of each group are combined in a respective OR circuit designated $OR_{11}$ for the first group, $OR_{12}$ for the second group, and so forth, these OR circuits in turn working into respective control leads designated $L_{11}$ through $L_{16}$. Similarly, the outputs of corresponding units of all six groups (such as $B_{11}$, $B_{21}$, . . . $B_{61}$ or $B_{18}$, . . . $B_{28}$, . . . $B_{68}$) are combined in respective OR circuits designated $OR_{21}$, $OR_{22}$ etc. working into respective control leads $L_{21}$ through $L_{28}$; as indicated in FIG. 7 by dotted lines, however, OR circuits $OR_{11}$–$OR_{68}$ are not directly connected to the respective selector units, the connection to each of these OR circuits including a set of AND gates as described hereinafter with reference to FIG. 4.

Also shown in FIG. 1 is a matrix of 48 coincidence gates, specifically three-input AND circuits, which have been designated $A_{11}$–$A_{68}$ in conformity with the designations of the corresponding selector units $B_{11}$–$B_{68}$. This matrix consists of six horizontal rows and eight vertical columns, only the first, second and last rows and the first, second and last columns having been illustrated. Each row is under the control of a respective row switch $E_{11}$ (gates $A_{11}$, $A_{12}$, . . . $A_{18}$), $E_{12}$ (gates $A_{21}$, $A_{22}$, . . . $A_{28}$, . . . $E_{16}$), (gates $A_{61}$, $A_{62}$, . . . $A_{68}$), each column being similarly under the control of a respective column switch $E_{21}$ (gates $A_{11}$, $A_{21}$, . . . $A_{61}$), $E_{22}$ (gates $A_{12}$, $A_{22}$, . . . $A_{62}$), . . . $E_{28}$ (gates $A_{18}$, $A_{28}$, . . . $A_{68}$); the output lines of the several coincidence gates have been designated $U_{11}$–$U_{68}$.

Each of the control leads $L_{11}$–$L_{16}$ terminates at an input of a respective row switch $E_{11}$–$E_{16}$ whereas each of the control leads $L_{21}$–$L_{28}$ terminates at an input of a respective column switch $E_{21}$–$E_{28}$. The row switches have output leads $e_{11}$, $e_{12}$, . . . $e_{18}$ which, apart from serving to energize one input of each coincidence gate of a respective row, extend to the inputs of all the column switches $E_{21}$–$E_{28}$ in a manner more fully described hereinafter with reference to FIG. 4 Output leads $I_1$, $I_2$, . . . $I_8$ of the several column switches terminate at other inputs of the coincidence gates of the respective columns and also extend to a common NOR circuit O*c* whose output is tied to an input of each of two AND gates A*c* and A*r*. The other input of gate A*c* receives sampling pulses S*c* which, in the presence of an output from NOR circuit O*c*, pass the gate A*c* as trigger pulses applied to all the column switches $E_{21}$–$E_{28}$ in parallel. AND gate A*r* receives periodic row-resetting pulses R*r* which, again in the presence of an output from NOR circuit O*c*, pass the gate A*r* in the form of pulses R applied in parallel to resetting inputs of all the row switches $E_{11}$–$E_{16}$. Column-resetting pulses R*c* are periodically applied to resetting inputs of all the column switches $E_{21}$–$E_{28}$. Switches $E_{11}$–$E_{18}$ also receive, at the beginning of each distribution cycle, a starting pulse *Avv* applied thereto in parallel as more fully described hereinafter with reference to FIG. 3. Both sets of switches $E_{11}$–$E_{18}$ and $E_{21}$–$E_{28}$ receive, at the end of each distribution cycle, a presetting pulse P*s* designed to clear the matrix if any of these switches has remained off-normal.

An input pulse C is repetitively applied, during each distribution cycle, to the third inputs of all coincidence gates $A_{11}$–$A_{68}$ in parallel, the number of such input pulses being generally less than the number $mn$ (here 48) of selector units $B_{11}$–$B_{68}$ and coincidence gates $A_{11}$–$A_{68}$. In many instances, particularly in two-way communication systems in which at least half the number of subscriber lines is assumed to be idle at any particular instant, the number of input pulses C per cycle (as well as the number of scanning pulses S*c* and resetting pulses R*c*, R*r*) may be conveniently chosen to equal $mn/2$ (here 24).

Figure 3:
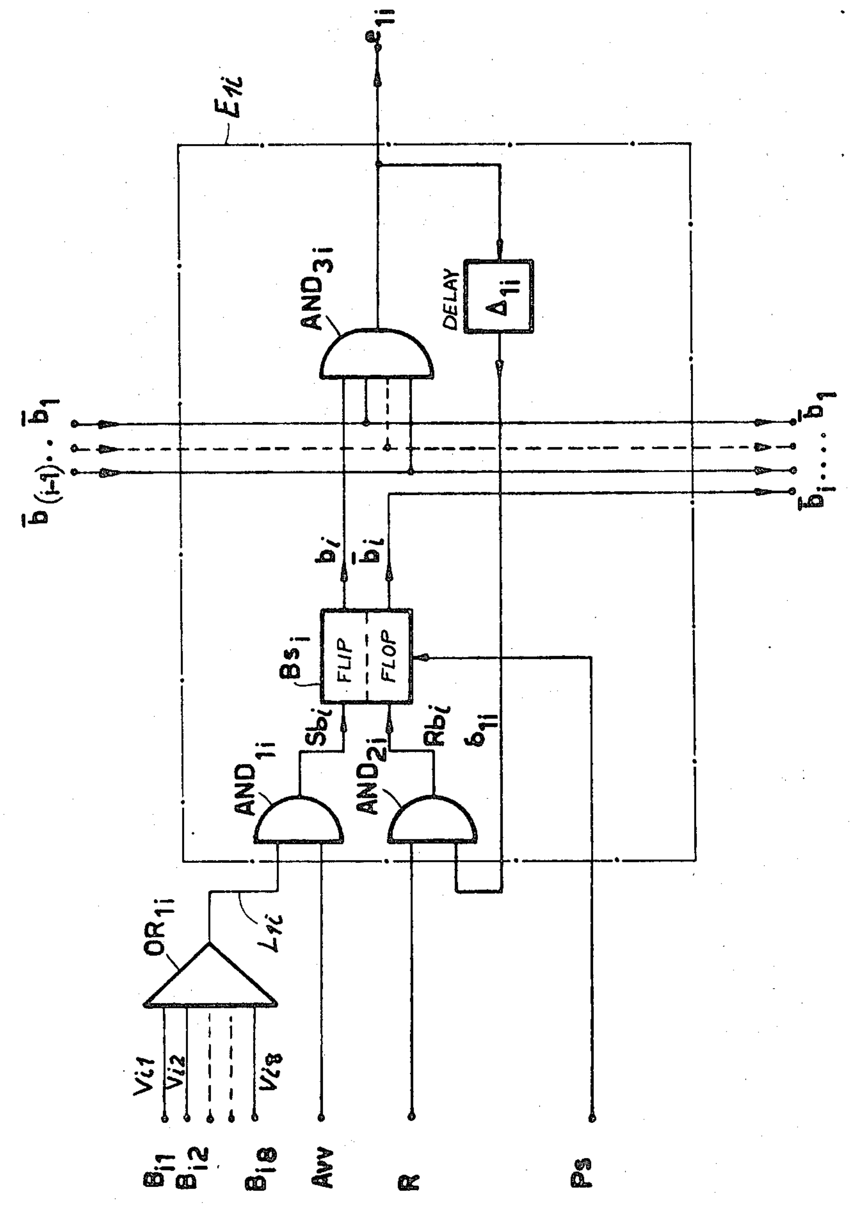
FIG. 3 shows details of a row switch of the system of FIG. 1 together with associated circuitry.

FIG. 3 illustrates details of a row switch generally designated $E_{11}$. This switch comprises a bistable circuit or flip-flop $Bs_1$ having a setting input connected to an output lead $Sb_1$ of a first AND gate $AND_{11}$ and a resetting input connected to an output lead $Rb_1$ of a second AND gate $AND_{2i}$. Gate $AND_{11}$ has input connections to the source of starting pulses A*vv* and, through the associated OR circuit $OR_{11}$, to the corresponding selector units $B_{11}$, $B_{12}$, . . . $B_{18}$ which in their actuated condition emit signal voltages $v_{11}$, $v_{12}$, . . . $v_{18}$. Gate AND $_{21}$ has a first input connected to receive the resetting pulses R from gate A*r* (FIG. 1) and has a second input connected to the output lead $e_{11}$ of switch $E_{11}$ through a feedback loop including a delay device $\Delta_{11}$ giving rise to a delay activation pulse $\delta_{11}$. Flip-flop $Bs_1$ has a first output lead $b_1$ which is energized in its set condition, thus producing an activation signal, and a second output lead $\bar{b}_i$ which is energized in the reset condition of the flip-flop, thus carrying an inverted activation signal. A further AND gate $AND_{3i}$ has an input connected to lead $b_1$ and other inputs connected to respective leads $\bar{b}_1$–$\bar{b}_{(i-1)}$ from the inversion outputs of all the preceding row switches, these leads forming part of a lock-out chain preventing the simultaneous energization of two or more output leads $e_{11}$. It will be understood that AND gate $A_{31}$ can be omitted in the first row switch $E_{11}$ and that output lead $\bar{b}_i$ has no function in the last row switch $E_{16}$.

Figure 4:
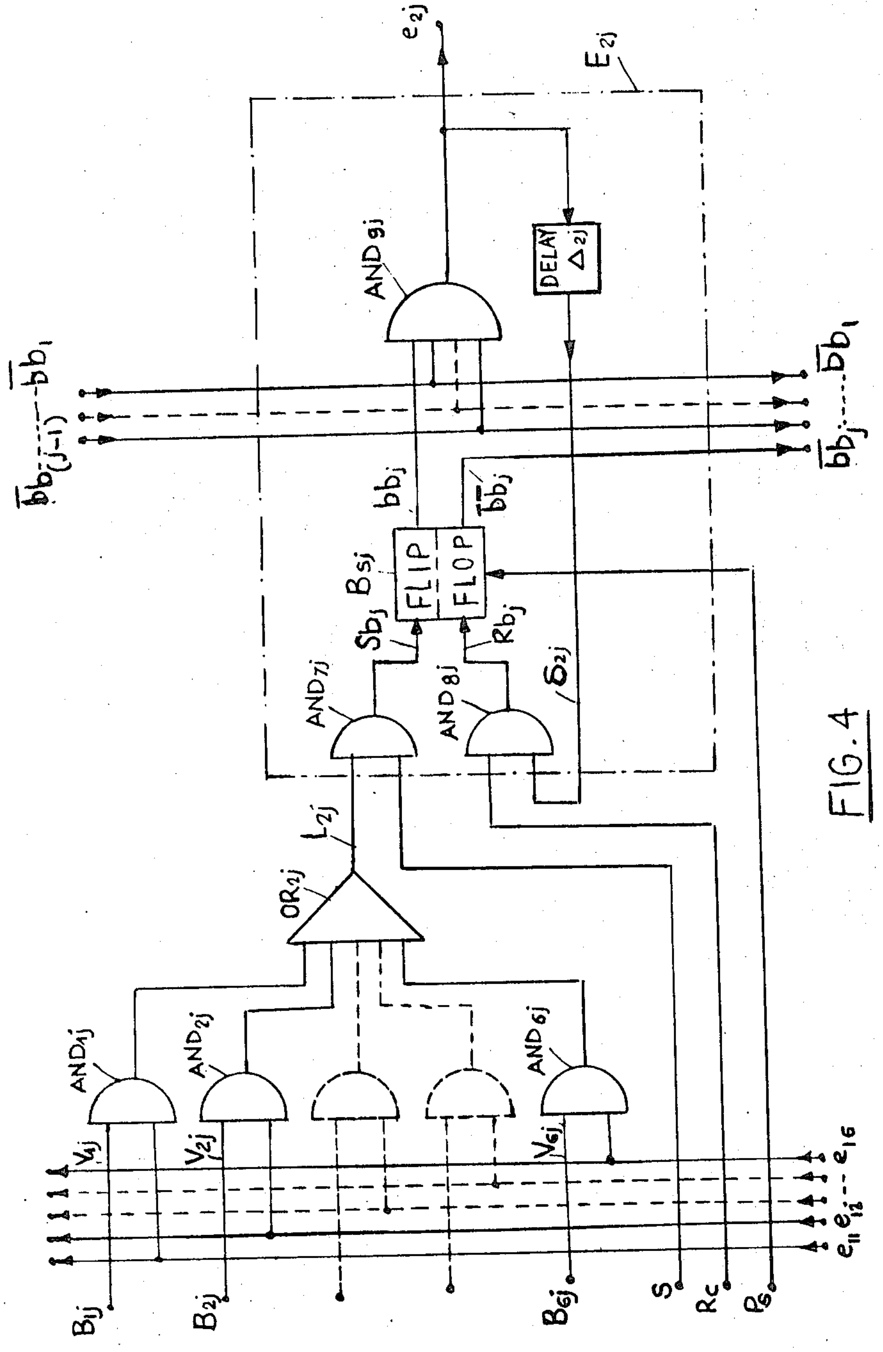
FIG. 4 shows details of a column switch of the system of FIG. 1 together with associated circuitry.

FIG. 4, similarly, shows a column switch $E_{2j}$ representative of any of the switches $E_{21}$–$E_{28}$. The column switch proper has essentially the same structure as the row switch of FIG. 3, including a flip-flop $Bs_j$, a first and second AND gate $AND_{7j}$ and $AND_{8j}$ with output leads $Sb_j$ and $Rb_j$ respectively terminating at a setting and a resetting input oi the flip-flop, and a third AND gate $AND_{9j}$ whose output lead $e_{2j}$ is connected via a delay device $\Delta_{2j}$ in a feedback loop to one of the inputs of gate $AND_{8j}$ for supplying thereto a delayed activation pulse $\delta_{2j}$, the other input of this gate receiving the column-resetting pulses R*c*. Gate $AND_{7j}$ receives on the one hand the trigger pulses S from circuit Ac (FIG. 1) and on the other hand the output of the associated OR circuit $OR_{2j}$ which in turn is connected to the outputs of a set of AND gates $AND_{1j}$, $AND_{2j}$, . . . $AND_{6j}$ each having one input connected to the corresponding selector unit $B_{1j}$, $B_{2j}$, . . . $B_{6j}$ (emitting a signal voltages $v_{1j}$, . . . $v_{2j}$, . . . $v_{6j}$) and another input connected to the output lead $e_{11}$, $e_{12}$, . . . $e_{16}$ of the row switch controlled by the group of which the respective selector unit $B_{1j}$ etc. forms a part. The direct-output lead $bb_j$ of flip-flop $Bs_j$ carrying the activation signal, is connected to an input of gate $AND_{9j}$ while the inverted-output lead $\overline{b}_j$ terminates at coresponding AND gates of subsequent column switches, gate $AND_{9j}$ also having inputs connected to a lockout chain constituted by leads $\overline{bb}_1$–$\overline{bb}_{(j-1)}$ of preceding column switches. Again, gate $AND_{9j}$ will be omitted in the first column switch $E_{21}$ whereas lead $\overline{bb}_j$ will be functionless and may therefore be left out in the last column switch $E_{28}$.

Figure 5:
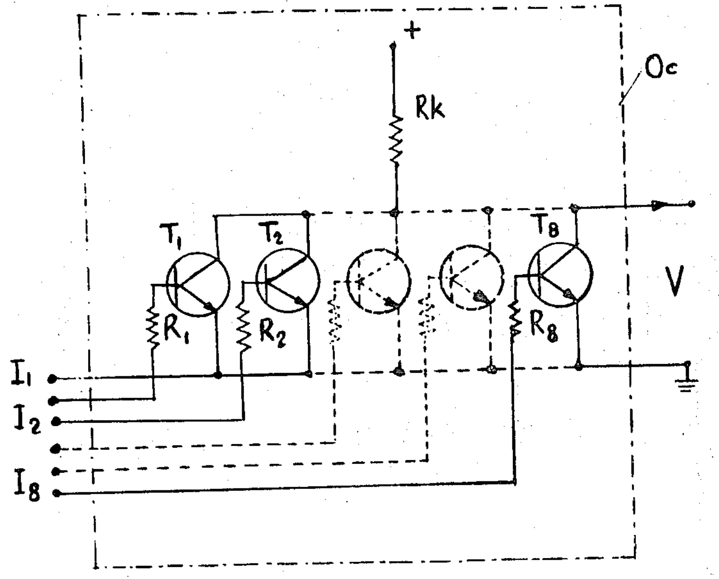
FIG. 5 illustrates a preferred embodiment of a NOR circuit forming part of the system of FIG. 1.

FIG. 5 illustrates a preferred embodiment of NOR circuit Oc. This circuit comprises a multibranch amplifier with transistors $T_1$, $T_2$, . . . $T_8$, an input electrode (base) of each branch being connected through a respective resistor $R_1$, $R_2$, . . . $R_8$ to the output lead $I_1$, $I_2$, . . . $I_8$ of a respective column switch. The collectors of all the transistors are connected through a common resistor Rk to a source of potential (here positive) which appears as a voltage V across the output terminals of the circuit when none of the parallel branches $T_1$–$T_8$ is energized. If, however, a positive voltage appears on any of the input leads $I_1$–$I_8$ of this circuit, voltage V disappears. Circuit Oc may also be considered the equivalent of a combination of an OR gate with inverter.

In logical notation, the signals $Sb_i$, $Rb_i$, R, $e_{1i}$, $Sb_j$, S, $Rb_j$ and $e_{2j}$ of FIGS. 3 and 4 may be expressed by the following functions:

$$Sb_i = Avv \cdot \sum_{k=1}^{8} v_{ik} \qquad (1)$$

$$Rb_i = R \cdot \delta_{1i} \qquad (2)$$

$$R = Rr \cdot \overline{\sum_{j=1}^{8} e_{2j}} \qquad (3)$$

$$e_{1i} = b_i \cdot \prod_{k=1}^{i-1} \overline{b}_k \qquad (4)$$

$$Sbj = S \cdot \sum_{h=1}^{6} v_{hj} \cdot e_{1h} \qquad (5)$$

$$S = Sc \cdot \overline{\sum_{j=1}^{8} e_{2j}} \qquad (6)$$

$$Rb_j = Rc \cdot \delta_{2j} \qquad (7)$$

$$e_{2j} = bb_j \cdot \prod_{h=1}^{j-1} \overline{bb}_h \qquad (8)$$

Figure 6:
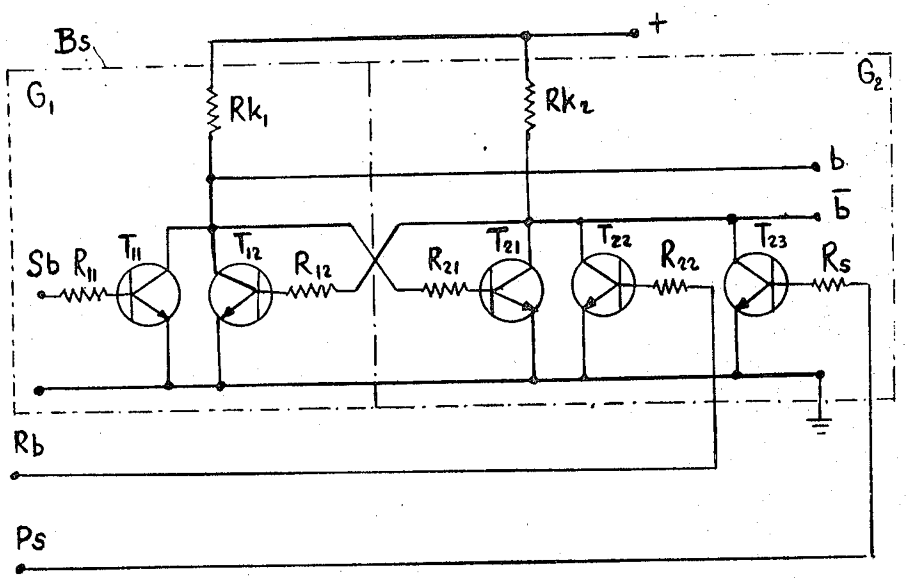
FIG. 6 illustrates a preferred embodiment of a flip-flop forming part of the row switch of FIG. 3 or the column switch of FIG. 4.

In FIG. 6 we have shown a bistable circuit Bs representative of any of the flip-flops $Bs_i$ (FIG. 3) and $Bs_j$ (FIG. 4) of the system. This flip-flop comprises two multivibrator sections $G_1$, $G_2$, section $G_1$ including two grounded-emitter NPN transistors $T_{11}$, $T_{12}$ connected to positive potential through a collector resistance $Rk_1$ whereas section $G_2$ includes three grounded-emitter NPN transistors $T_{21}$, $T_{22}$, $T_{23}$ connected to the same potential source through a collector resistance $Rk_2$. The collectors and the bases of transistor $T_{12}$ and $T_{21}$ are cross-connected, as in a conventional bistable multivibrator, by way of resistors $R_{12}$ and $R_{21}$. Further resistors $R_{11}$, $R_{22}$ and Rs connect the base of transistor $T_{11}$ to enabling lead Sb (representative of leads $Sb_1$, $Sb_j$ of FIGS. 3 and 4), the base of transistor $T_{22}$ to resetting lead Rb (representative of leads $Rb_i$, $Rb_j$) and the base of transistor $T_{23}$ to the conductor carrying the presetting pulses Ps. The collectors of multivibrator section $G_1$ are connected to an output lead b, representative of leads $b_i$ and $bb_j$ of FIGS. 3 and 4, whereas the collectors of section $G_2$ are connected to an output lead $\overline{b}$ representative of leads $\overline{b}_i$ and $\overline{bb}_j$ of the preceding figures. Thus, the two stages proper $T_{12}$, $T_{21}$ of the multivibrator are respectively shunted by transistor $T_{11}$, to be short-circuited in the presence of an enabling signal on lead Sb, and by transistors $T_{22}$ and $T_{23}$, to be short-circuited in the presence of a resetting pulse Rb or a presetting signal Ps.

The transistorized components of FIGS. 5 and 6 can be designed as compact integrated circuits that are easily replaceable.

Figure 2:
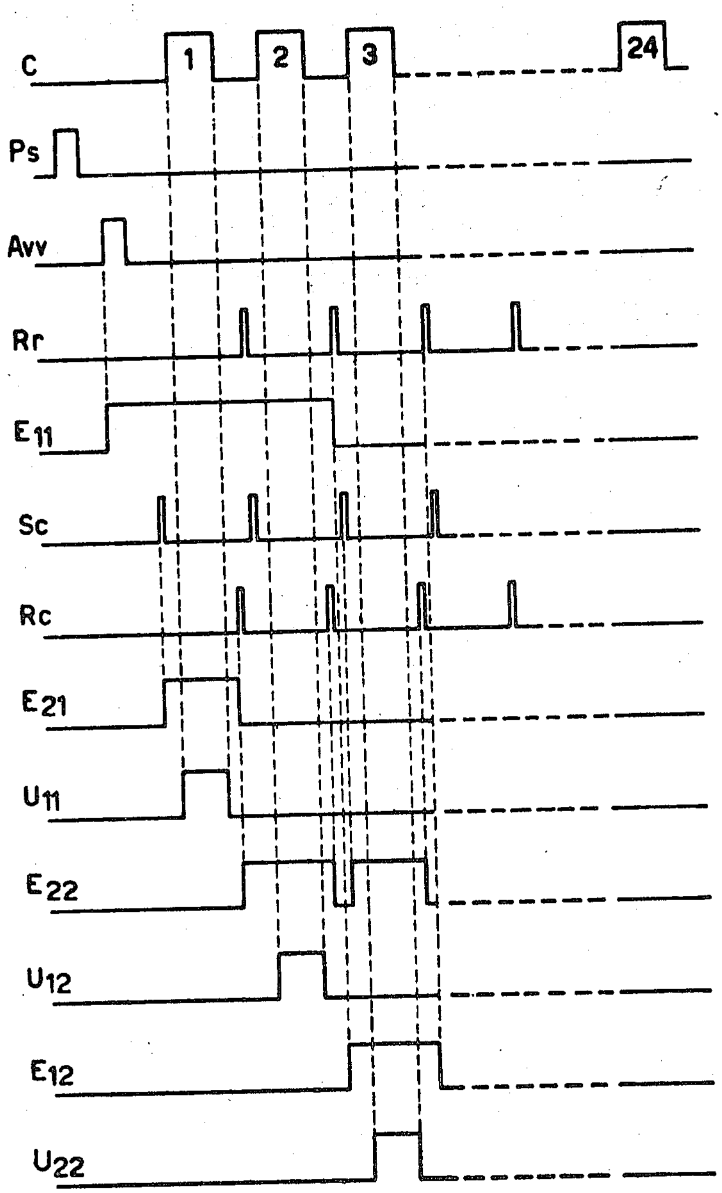
FIG. 2 is a set of graphs illustrating the operation of the system of FIG. 1.

The operation of the pulse distributor shown in FIG. 1 will now be described with reference to FIG. 2. At the beginning of a distribution cycle or the end of an immediately preceding cycle, a presetting pulse Ps applied to all switches $E_{11}$–$E_{16}$ and $E_{21}$–$E_{28}$ clears the matrix by resetting the flip-flop $Bs_i$, $Bs_j$ of any switch that may still have remained set. Next, a starting pulse Avv appears at gate $AND_{11}$ of each row switch to set the flip-flop thereof if the corresponding OR circuit $OR_{1i}$ has an output. Let us assume, by way of example, that selector units $B_{11}$, $B_{12}$ and $B_{22}$ have been seized, i.e. that these gates are open to pass pulses to OR circuits $OR_{11}$, $OR_{12}$. Pulse Avv then sets the gate $AND_{11}$ of switch $E_{11}$ and activates same since this switch has no output gate $AND_{31}$ blocked by an inhibiting signal from a preceding row switch. (If OR circuit $OR_{11}$ were not energized at this time, switch $E_{12}$ would respond in the same manner since its gate $AND_{31}$ would be unblocked.) The signal on output lead $e_{11}$ reaches an input of gate $AND_{1j}$ controlling OR gate $OR_{21}$ associated with the first column switch $E_{21}$, this AND gate beging now open since its other input receives a signal from the actuated selector unit $B_{11}$. Lead $L_{2j}$ of switch $E_{21}$ is thus energized so that the switch is conditioned for subsequent enablement, along with switch $E_{22}$ whose input gate $AND_{2j}$ is similarly opened by signals from unit $B_{12}$ and lead $e_{12}$. Row switch $E_{12}$ is enabled through the setting of ist flip-flop by signal Avv in the energized condition of OR circuit $OR_{12}$ because of the seizure of unit $B_{22}$.

Immediately thereafter, the first sampling pulse Sc of the cycle appears at gate Ac. Since none of column switches $E_{21}$–$E_{28}$ is activated at this time, NOR circuit Oc has an output so that gate Ac passes the pulse Sc which, in the form of a trigger pulse S, reaches the gates $AND_{7j}$ of all the column switches and enables the previously conditioned switches $E_{21}$ and $E_{22}$; since switch $E_{21}$ does not have an output gate $AND_{9j}$ blocked by an inhibition signal from a preceding column switch, it is immediately activated so that two of the inputs of coincidence gate $A_{11}$ now carry activation signals from switches $E_{11}$ and $E_{21}$, respectively. The first input pulse C, following closely upon sampling pulse Sc, therefore passes the gate $A_{11}$ to produce an output pulse on its line $U_{11}$.

A column-resetting pulse Rc now appears at the input gates $AND_{8j}$ of all the column switches but is effective only at switch $E_{21}$ whose activation signal has reached the other input of that gate in the form of a delayed pulse $\delta_{2j}$. The resulting pulse on lead $Rb_j$ resets the flip-flop $Bs_j$ and switch $E_{21}$ is deactivated, removing the inhibiting signal (e.g. zero voltage) from its lead $\overline{bb}_j$ so that gate $AND_{9j}$ of enabled switch $E_{22}$ immediately opens and coincidence gate $A_{12}$ responds by transmitting the No. 2 input pulse C to its output line $U_{12}$. Switch $E_{22}$ is then restored by the next column-resetting pulse Rc so that NOR circuit Oc conditions the gates Ar and Ac for passage of the almost simultaneous pulses Rr and Sc occurring thereafter; it will be noted that, by virtue of the practically continuous energization of NOR gate Oc through the immediately consecutive activation of switches $E_{21}$ and $E_{22}$, the first pair of these pulses $Rr$, $Sc$ had been ineffectual. Now, however, pulse $Rr$ gives rise to a pulse R (FIGS. 1 and 3) which, jointly with the delayed activation pulse $\delta_{11}$ from lead $e_{11}$, opens the gate $AND_{21}$ of the switch $E_{11}$ to deactivate same; the resulting removal of the inhibiting signal (zero voltage) from lead $\bar{b}_i$ of switch $E_{11}$ results in the immediate activation of the previously enabled row switch $E_{12}$. With the occurrence of the next sampling pulse $Sc$, column switch $E_{22}$ is enabled by a signal on lead $L_{2j}$ as gate $AND_{2j}$ there of responds to voltages from selector unit $B_{22}$ and lead $e_{12}$; since there is no inhibiting signaling condition from preceding column switch $E_{21}$, switch $E_{22}$ is immediately activated and causes the opening of coincidence gate $A_{22}$ for passage of the No. 3 input pulse C to line $U_{22}$. Thereafter, switches $E_{12}$ and $E_{22}$ are restored in the aforedescribed manner and the system remains idle until, after the No. 24 input pulse C, the next cycle begins.

We claim:

1. A pulse distributor for generating distribution signals on a selected number of output lines, comprising:

selector means including a multiplicity of individually actuatable units divided into $n$ groups of $m$ units each, the number $mn$ of said units equaling the total number of said output lines;

a like multiplicity of circuit elements arranged in a matrix of $m$ columns and $n$ rows;

a set of $n$ row switches each having output connections to the elements of a respective row, each of said row switches being assigned to a respective group of said units;

a set of $m$ column switches each having output connections to the elements of a respective column, each of said column switches being assigned to a corresponding unit in each of said groups;

first circuit means extending from said $n$ groups of units to the row switches respectively assigned thereto for activating, at the beginning of a distribution cycle, a first row switch assigned to an actuated unit for enabling subsequent row switches as assigned, said row switches being connected in a first lockout chain preventing the simultaneous activation of a plurality of row switches;

second circuit means extending from corresponding units of all said groups to the column switches respectively assigned thereto, said second circuit means including a logic network for enabling any column switch assigned to an actuated unit only upon concurrent activation of a row switch assigned to the same unit and for activating the first enabled switch of said set of column switches, simultaneous activation of a row switch and a column switch assigned to an actuated unit of said selector means giving rise to two coincident activation signals for triggering a corresponding circuit element of said matrix into generation of a distribution pulse on an associated output line representing the actuated unit, said column switches being connected in a second lockout chain preventing the simultaneous activation of a plurality of column switches;

column-resetting means periodically operative for deactivating a previously activated column switch and permitting activation of a subsequent column switch enabled by said second circuit means upon continuing activation of a previously activated row switch;

and row-resetting means operative upon deactivation of the last previously enabled column switch for deactivating a previously activated row switch and permitting activation of a further row switch enabled by said first circuit means with resulting enablement of a column switch under the control of said second circuit means.

2. A pulse distributor as defined in claim 1 wherein said logic network comprises a set of $n$ AND gates for each column switch, each of said AND gates having a first input connected to a corresponding unit of said selector means and a second input connected to an output of a respective row switch, said AND gates having outputs connected in an OR circuit to an input of the respective column switch.

3. A pulse distributor as defined in claim 2 wherein each column switch comprises a flip-flop having a setting input connected to said OR circuit and a resetting input connected to said column-resetting means.

4. A pulse distributor as defined in claim 3 wherein each column switch includes a first AND gate between said OR circuit and said setting input, said first AND gate having an input connection to a source of sampling pulses, and further includes a second AND gate between said resetting input and said row-resetting means, the column switch being provided with feedback means for delivering a delay activation pulse from its own output to said second AND gate.

5. A pulse distributor as defined in claim 4 wherein the flip-flop of each column switch except the last one has a first output for producing the activation signal and a second output for producing an inversion of said activation signal, said second output forming part of said second lockout chain, each column switch except the first one including a further AND gate with input connections to said first output of the flip-flop of the same column switch and to said second output of the flip-flop of each preceding column switch.

6. A pulse distributor as defined in claim 3, further comprising clearing means operative at the end of a distribution cycle for applying a presetting pulse to each of said row and column switches, said flip-flop having a resetting terminal connected to said clearing means.

7. A pulse distributor as defined in claim 1 wherein said first circuit means comprises a source of starting pulses and further comprises an OR circuit for each row switch with input connections to the units off the respective group, each row switch including a flip-flop with a setting input and a resetting input, a first AND gate having one input connected to said OR circuit and another input connected to said source and having an output connected to said setting input, a second AND gate between said resetting input and said column-resetting means, and feedback means for delivering a delayed activation pulse from the output of the row switch to said second AND gate.

8. A pulse distributor as defined in claim 7 wherein the flip-flop of each row switch except the last one has a first output for producing the activation signal and a second output for producing an inversion of said activation signal, said second output forming part of said first lockout chain, each column switch except the first one including a further AND gate with input connections to said first output of the flip-flop of the same row switch and to said second output of the flip-flop of each preceding switch.

9. A pulse distributor as defined in claim 7, further comprising clearing means operative at the end of a distribution cycle for applying a presetting pulse to each of said row and column switches, said flip-flop having a resetting terminal connected to said clearing means.

10. A pulse distributor as defined in claim 1 wherein said second circuit means comprises a source of periodic sampling pulses and logical circuitry connected to the outputs of all said column switches for permitting passage of a sampling pulse from said source to said column switches for activation thereof only in the absence of an activation signal from any column switch.

11. A pulse distributor as defined in claim 10 wherein said logical circuitry includes a NOR circuit with input connections to the outputs of all said column switches and an AND gate having inputs connected to said source and to the output of said NOR circuit.

12. A pulse distributors as defined in claim 11 wherein said row-resetting means includes a source of recurrent resetting pulses and another AND gate having inputs connected to the last-mentioned source and to the output of said NOR circuit.

13. A pulse distributor as defined in claim 11 wherein said NOR circuit includes a multibranch amplifier having an output of each branch connected to an input of a respective column switch.

14. A pulse distributor as defined in claim 1 wherein each of said row and column switches comprises a flip-flop with a setting input for enabling the switch and a resetting input for deactivating same.

15. A pulse distributor as defined in claim 14 wherein said flip-flop includes a first and a second multivibrator section, first amplifier means connected across said first section for short-circuiting same in response to an enabling signal, and second amplifier means connected across the second section for short-circuiting same in response to a deactivation signal.

16. A pulse distributor as defined in claim 15, further comprising a source of presetting pulses connected to said second amplifier means and operative at the end of a distributing cycle for short-circuiting said second section.

17. A pulse distributor as defined in claim 1 wherein each of said circuit elements is a coincidence gate having input means for receiving periodically recurrent input pulses and passing same to the associated output line in the presence of simultaneous activation signals from associated row and column switches.

References Cited

UNITED STATES PATENTS

| | | | |
|---|---|---|---|
| 3,157,858 | 11/1964 | Barbagallo | 340—166X |
| 3,176,144 | 3/1965 | Gunderson et al. | 340—166X |
| 3,233,223 | 2/1966 | Buelow et al. | 340—166 |
| 3,453,421 | 7/1969 | Tonnesson | 340—166X |

DONALD J. YUSKO, Primary Examiner

U.S. Cl. X.R.

328—75